G. H. Gregory,
Churn.
No. 98,161.   Patented Dec. 21, 1869.
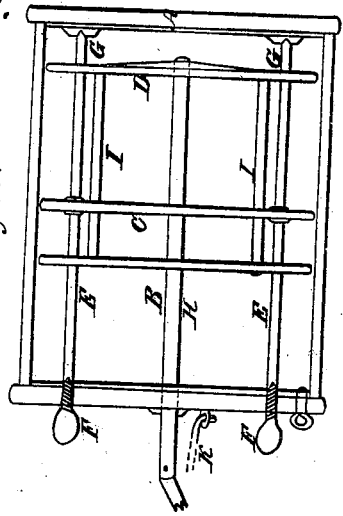
Fig. 2.
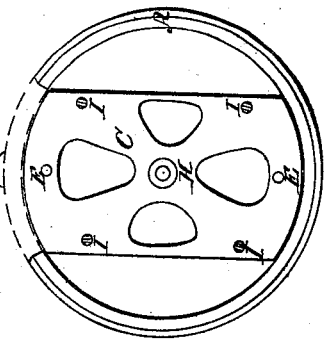
Fig. 3.
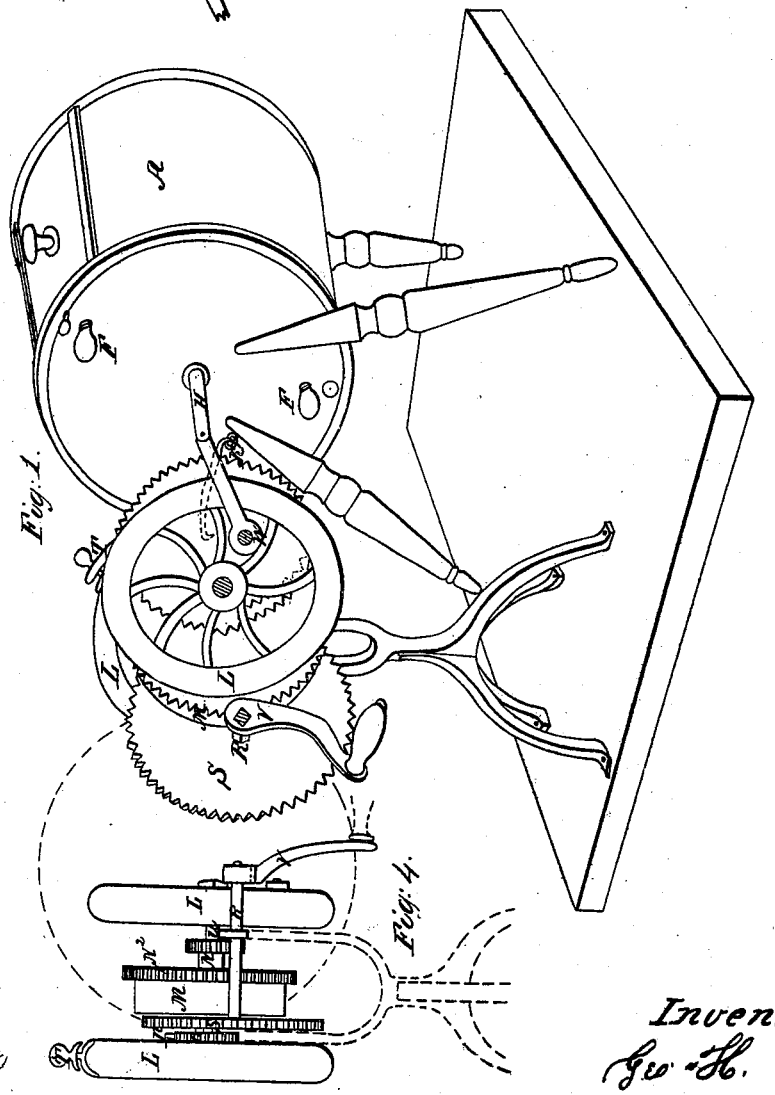
Fig. 1.
Fig. 4.
Witnesses:
Wm Vine
Andrew Selleck
Inventor:
Geo. H. Gregory

United States Patent Office.

GEORGE H. GREGORY, OF NORTH WILTON, CONNECTICUT.

Letters Patent No. 98,161, dated December 21, 1869.

IMPROVEMENT IN CHURNS.

The Schedule referred to in these Letters Patent and making part of the same.

*To all whom it may concern:*

Be it known that I, GEORGE H. GREGORY, of the town of North Wilton, county of Fairfield, and State of Connecticut, have invented new and useful Improvements in Butter-Churns; and I do hereby declare that the following is a full and correct description thereof, reference being had to the accompanying drawing, and to the letters of reference marked thereon.

The nature of my invention consists in the arrangement of a horizontally-working churn, actuated by a coiled spring and attachment, and in combination with a crank-motion.

To enable others skilled in the art to make and use my invention, I will proceed to describe the same.

The Drawing.

Figure 1 is a perspective view of the churn and machinery.

Figure 2, a longitudinal section of the churn.

Figure 3, a transverse section of the churn.

Figure 4, end view of part of the mechinery, and the spring-box.

The body of the churn is composed of a cylinder of wood, and is placed in a horizontal position, and supported on three legs, fig. 1, and when in operation is attached to the stand of the operating-machinery by means of rods, hooked into eyes in the front end of the cylinder, and into eyes on the frame of the stand, so that it can be removed when not in operation, and the working-machinery can be used for other purposes.

The churn contains three vertical dashers, B C D. The middle one is stationary, and the other two, B D, work horizontally.

The middle one is held in position by being attached permanently to the two rods E E.

These rods are held in position by the two set-screws F F and end-pins G G.

The two dashers B D are connected together by the four rods I I I I, and these rods slide through holes in the middle fixed dasher C, as shown in the drawing, caused by the main rod or plunger H being fastened to the end dasher D, which moves back and forward by the action of the machinery.

The dashers, being all connected together by the rods F and I, are easily taken out bodily for cleaning, through openings in the lid, when the main plunger H is removed by being unscrewed from the end dasher D, and taken out through the hole in the front head, and the set-screws F F are withdrawn from the two rods E E.

All three of the dashers are properly perforated, and, by their united and travelling action, cause extreme action and agitation of the cream, and a quick production of butter.

The machinery for working my churn is composed of a series of gear-wheels, and fly-wheels, and a box containing a coiled spring, inside of the box, all placed on a stand, as shown in the drawing, fig. 1, and attached to the churn by the rods K.

The main shaft $a$ passes through the hollow shaft N, and is fastened permanently, at each end, to the two fly-wheels L L.

The spring-box M is fastened to the hollow shaft N and gear-wheel $N^2$, and the coiled spring within the box is attached to the hollow shaft, and pinion, and ratchet O, and when the spring is wound up the pawl P holds it for operation, and the brake T regulates the speed.

The crank-shaft R extends to the gear-wheel S, which works in the pinion attached to the ratchet O, and winds up the spring.

After the spring is wound by the crank V, all the gears are set in motion by the tension of the coiled spring in the box M, and the speed is regulated by the brake T; and when the power of the spring is reduced, the crank V will operate to continue the churning, if found necessary, and which can be used at any time without the action of the spring.

What I claim as my invention, and desire to secure by Letters Patent, is—

The arrangement of the horizontally-working churn A, containing three vertical dashers B C D, to be actuated by and in combination with the spring-power machinery, or its equivalent, in the manner and for the purpose substantially as herein described.

GEO. H. GREGORY.

Witnesses:
 WM. VINE,
 ANDREW SELLECK.